United States Patent
Dolata

(10) Patent No.: US 8,827,381 B2
(45) Date of Patent: Sep. 9, 2014

(54) SEAL ARRANGEMENT AND LINK OF A CHAIN HAVING THE SEAL ARRANGEMENT

(75) Inventor: Wolfgang Dolata, Leichlingen (DE)

(73) Assignee: Aktiebolaget SKF, Gothenburg (SE)

( * ) Notice: Subject to any disclaimer, the term of this patent is extended or adjusted under 35 U.S.C. 154(b) by 591 days.

(21) Appl. No.: 13/122,040

(22) PCT Filed: Oct. 1, 2009

(86) PCT No.: PCT/EP2009/007050
§ 371 (c)(1),
(2), (4) Date: Jun. 23, 2011

(87) PCT Pub. No.: WO2010/037544
PCT Pub. Date: Apr. 8, 2010

(65) Prior Publication Data
US 2011/0248561 A1    Oct. 13, 2011

(30) Foreign Application Priority Data
Oct. 2, 2008    (DE) .......................... 10 2008 049 911

(51) Int. Cl.
*B62D 55/088* (2006.01)
*B62D 55/21* (2006.01)
*F16J 15/34* (2006.01)
*B62D 55/15* (2006.01)

(52) U.S. Cl.
CPC ............ *B62D 55/0887* (2013.01); *B62D 55/21* (2013.01); *F16J 15/344* (2013.01); *B62D 55/15* (2013.01)
USPC .......................... 305/103; 277/364; 277/402

(58) Field of Classification Search
CPC ...... B62D 55/15; B62D 55/21; B62D 55/088; B62D 55/0887; F16J 15/344; F16J 15/3456
USPC ........................... 305/103, 104; 277/364, 402
See application file for complete search history.

(56) References Cited

U.S. PATENT DOCUMENTS

| | | | | |
|---|---|---|---|---|
| 4,094,516 A | * | 6/1978 | Morley et al. .................. | 305/103 |
| 4,132,418 A | * | 1/1979 | Roli ................................ | 277/382 |
| 4,331,339 A | * | 5/1982 | Reinsma ........................ | 305/103 |
| 4,560,174 A | * | 12/1985 | Bisi .............................. | 277/382 |
| 4,607,854 A | * | 8/1986 | Bissi et al. .................... | 277/402 |
| 4,819,999 A | * | 4/1989 | Livesay et al. ................ | 305/103 |

(Continued)

FOREIGN PATENT DOCUMENTS

DE       2726033 A1    12/1977
DE   102004031941 A1     1/2006

(Continued)

*Primary Examiner* — Paul N Dickson
*Assistant Examiner* — Timothy Wilhelm
(74) *Attorney, Agent, or Firm* — Bryan Peckjian; SKF USA Inc. Patent Department

(57) ABSTRACT

A sealing assembly for a track hinge comprises a sealing ring having an annular sealing edge that sealingly abuts on a radially-extending surface of a bushing of the track hinge. An elastic ring fixedly abuts on an outer track link of the track hinge and biases the sealing ring in axial and radial directions. A support ring is disposed radially inward of the sealing ring and is connected at least substantially to a radially-inner surface of the sealing ring. The support ring at least substantially prevents the sealing ring from directly contacting a radially-inner portion of the track hinge at least in the radial direction.

22 Claims, 1 Drawing Sheet

(56) References Cited

U.S. PATENT DOCUMENTS

| | | | | |
|---|---|---|---|---|
| 5,390,997 | A | * | 2/1995 | Nakaishi et al. ............... 305/103 |
| 5,794,940 | A | * | 8/1998 | Brueggmann ................. 277/364 |
| 8,360,534 | B2 | * | 1/2013 | Vom Stein .................... 305/103 |
| 8,485,926 | B2 | * | 7/2013 | Vom Stein et al. ............ 474/206 |

FOREIGN PATENT DOCUMENTS

| | | |
|---|---|---|
| EP | 0080009 A2 | 6/1983 |
| WO | 1576029 A | 10/1980 |
| WO | WO8203670 A1 | 10/1982 |
| WO | WO2008049529 A1 | 5/2008 |

\* cited by examiner

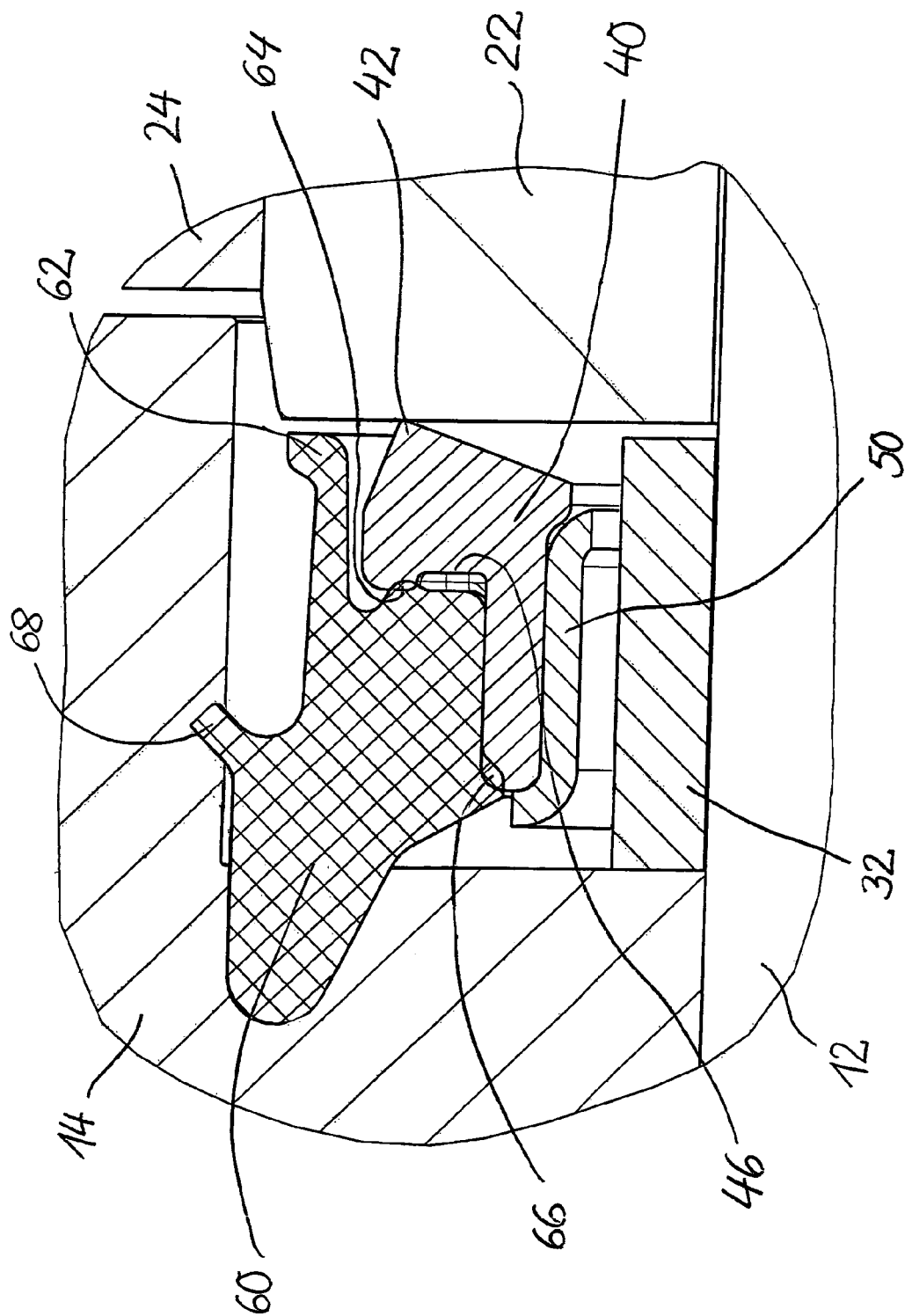

SEAL ARRANGEMENT AND LINK OF A CHAIN HAVING THE SEAL ARRANGEMENT

CROSS-REFERENCE

This application is the U.S. national stage of International Application No. PCT/EP2009/007050 filed on Oct. 1, 2009, which claims priority to German patent application no. 10 2008 049 911.0 filed on Oct. 2, 2008.

TECHNICAL FIELD

The invention relates to a sealing assembly for sealing between a first and a second portion of a track, which are at least pivotable relative to each other, and a hinge of a track having the sealing assembly.

RELATED ART

In tracks, in particular of tracked vehicles, the links of the track are typically connected with each other via pivot pin hinges. For this purpose, such a pivot pin hinge comprises a pin and a bushing that is pushed over the pin so as to be rotatable, wherein links of the track are respectively pressed onto the ends of the pin and the bushing. The pivot bearing surfaces between the pin and the bushing are lubricated by an oil reservoir in the pin, wherein the oil chamber between the pin and the bushing is sealed by two sealing elements that comprise sealing lips pressing against the end faces of the bushing.

A track pin assembly having a seal is known, for example, from DE 27 26 033 A1, wherein the track pin assembly comprises a track pin with a portion of a first track link attached to the track pin and a bushing with a portion of a second track link attached to the bushing, which bushing surrounds a portion of the track pin and is movable back and forth relative to the track pin. Further, the track pin assembly comprises a cavity disposed in the first track link for receiving the seal, which is provided with a sealing lip for abutment on an end face of the bushing, and a spacer ring, which surrounds the track pin and extends in the axial direction between an end face of the cavity and the end face of the bushing; the cavity forms a hollow space for receiving the seal. The seal inserted in the hollow space comprises a primary seal ring made of a relatively stiff, but elastic, first elastomeric material and a secondary sealing element made of a second resilient elastomeric material that is substantially less stiff than the first material.

A sealing assembly for a track pivot pin hinge is known from U.S. Pat. No. 4,607,854, in which a first ring made of a flexible elastomeric material having a bushing-like portion and a flange-like portion with a sealing lip and a second ring made of elastic material contacting the first for sealing a space between a pin and a bushing surrounding the pin are provided. The first ring comprises a cylindrical, metallic reinforcement ring that is completely embedded in the bushing-like portion of the first ring.

SUMMARY

In one aspect of the present teachings, a sealing assembly is provided for sealing between a first and a second portion of a track that are at least pivotable relative to the each other, which sealing assembly has, among other things, a particularly long service life for a cost-effective construction.

In another aspect of the present teachings, a sealing assembly for sealing between a first and a second portion of a track, which are at least pivotable relative to the each other, comprises the following features:

a sealing ring for sealing a lubrication chamber between the portions, which are pivotable relative to each other, the sealing ring having an annular-shaped sealing edge provided for sealing abutment on an opposing surface of one of the portions, an elastic ring for fixedly abutting on the other of the portions and for applying pressure onto the sealing ring, and a support ring connected substantially to the inner surface of the sealing ring, which support ring substantially prevents a direct contact of the sealing ring with a portion of the track at least in the radially inward direction, and wherein the sealing ring is devoid of an indentation that accommodates at least a portion of the support ring.

The invention is thus based upon the knowledge that, in a conventional sealing assembly wherein the sealing ring directly abuts on the track portion, in particular a pin or a spacer ring, the elastic ring is intentionally deformed when installed such that it generates forces in the axial as well as the radial direction, wherein the radially-acting forces cause, after a certain amount of time, the cylinder shell-like opposing surface to be pressed against the pin or spacer ring due to creeping effects, so that the sealing assembly becomes disadvantageously immovable and is no longer capable of compensating axial tolerances, which eventually causes leakages. A further effect contributing thereto is the deformation of the sealing ring that occurs when the pin and/or the spacer ring axially moves due to the radially-acting forces in combination with the friction of the sealing ring on the pin and/or sealing ring. The above-mentioned disadvantageous effects are avoided by the invention by inserting a support ring between the sealing ring and the pin or the spacer ring, which support ring supports the sealing ring; the large radial forces are absorbed by the support ring.

By forming the sealing-, elastic- and support rings as insert parts, which are loose relative to one another and can be assembled in a simple manner during the mounting, the entire sealing assembly is manufacturable in a simple and cost-effective manner. Using the inventive sealing assembly, a significantly longer service life is achieved, with even lower manufacturing costs, relative to comparable conventional sealing assemblies.

In an advantageous design, the elastic ring comprises an axially-projecting, hollow cylinder-like sealing lip, which in intended constructions of the sealing assembly also sealingly abuts, in a manner of speaking, outside of the sealing edge of the sealing ring on the opposing surface. A supplemental protection is provided for the sealing edge of the sealing ring with particular advantages, which, among other things, positively influences the service life of the sealing edge.

In an advantageous design, the support ring, the elastic ring and the sealing ring are designed in a manner so as to be matched to each other, such that the elastic ring, together with the sealing ring, seals the support ring towards the outside. Penetration of moisture from the outside into the support ring is thereby advantageously inhibited, so that the support ring, in particular in the embodiment of a metal ring, is protected against corrosion.

In an advantageous design, the inner surface side of the axial end of the elastic ring, which is remote from the opposing surface, is formed with an annular-encircling bulge. This should advantageously and reliably prevent an incorrect installation of the elastic ring rotated by 180°. At the same time, said bulge constitutes a supplemental sealing between the elastic ring and the support ring.

In an advantageous design, the outer surface side of the elastic ring is formed with an annular-encircling bulge that projects outwardly and obliquely to the opposing surface. After appropriately inserting the elastic ring, this should advantageously prevent the elastic ring from falling out again during its mounting.

In a further advantageous design, the elastic ring and the sealing ring are constructed so as to be prevented from rotating relative to each other. The advantages described in the introduction to claim 1 are thereby further augmented. The prevention from relative rotation can be effected by forming the elastic ring and the sealing ring with axially- and/or radially-extending, in particular nested, indentations and/or bulges that are distributed in the circumferential direction on axially- and/or radially-extending outer surface portions provided for abutting against each other.

Further advantages, features and details of the invention are derivable from the exemplary embodiments of the invention described in the following with the assistance of the FIGURE.

BRIEF DESCRIPTION OF THE DRAWING

The sole FIGURE shows a representative embodiment of the invention.

DETAILED DESCRIPTION OF THE INVENTION

As an exemplary embodiment of the invention, the FIGURE shows a longitudinal section through a sealing assembly for sealing between a first portion of a track and a second portion of the track that is at least pivotable relative to the first. The FIGURE merely shows an upper, leftmost region of the longitudinal section in a cut-out manner, wherein the not-illustrated, right region is designed as a mirror image of the illustrated region with respect to a vertical axis.

The first portion of the track comprises a pin 12 and an outer track link 14, one of its cylindrical bores being press-fit onto the pin 12. The second portion of the track comprises a bushing 22, which is at least pivotable about the pin 12 and is pushed over the pin 12 with a radial clearance, and a cylindrical bore of an inner track link 24 is press-fit onto the bushing 22. Further, a spacer ring 32, which is pushed over the pin 12 with a radial clearance, is disposed between the outer track link 14 and the bushing 22 with an axial clearance.

An assembly made of a support ring 50, a sealing ring 40 and an elastic ring 60 is disposed so as to encircle the spacer ring 32. The support ring 50, e.g., made of a metal, in particular a steel plate, is designed and formed in a substantially S-shaped cross-sectional surface. As a result, the left axial end of the support ring 50, which bends radially outward, slightly encompasses the adjacent axial end of the sealing ring 40. An annular bulge, which projects slightly radially inward, of the thus-formed sealing ring 40 connects to the right axial end of the support ring 50, which bends radially inward. With this design of the support ring 50 and the sealing ring 40 so as to be matched with each other, an assembly of the two rings 40 and 50, in which they are improperly offset by 180°, is reliably prevented in an advantageous manner.

Furthermore, the sealing ring 40 is designed and formed with a sealing edge 42 for sealing the space filled with oil that extends, in essence, between the outer surface of the pin 12 and the inner surface of the bushing 22; the sealing edge 42 is intended to sealingly abut on the end face of the bushing 22. Furthermore, the inner surface of the sealing ring 40 abuts on a large surface area of the outer surface of the support ring 50 and is designed and formed with a substantially L-shaped cross-sectional surface. The elastic ring 60 connects to the sealing ring 40 in the direction towards the outer track link 14.

The sealing ring 40 comprises an elastomeric material, in particular polyurethane, and can be formed so as to be fiber-reinforced. The elastic ring 60 also comprises an elastomeric material, in particular rubber, and is less stiff than the sealing ring 40. The support ring 50 is significantly stiffer than the sealing ring 40 and the elastic ring 60.

The sealing ring 40 and the elastic ring 60 are constructed so as to be prevented from rotating relative to each other. The prevention from relative rotation is effected by forming an end side of the sealing ring 40, which is opposite of the sealing edge 42, at which end side an end side of the elastic ring 60 is provided for abutment, with axially-extending recesses 46 distributed in the circumferential direction and additionally, if necessary, by forming said end side of the elastic ring 60 with corresponding sector-like bulges spaced from one another in the circumferential direction.

In order to inhibit corrosion of the metallic support ring 50 due to moisture penetrating inward from the outside, the support ring 50, the elastic ring 60 and the sealing ring 40 are designed in a matching manner. For this purpose, the elastic ring 60 is designed and formed with an axial, annular protrusion 64 that is provided for sealingly abutting on the opposing end face of the sealing edge 42 of the sealing ring 40. Further, the elastic ring 60 is formed with an annular-encircling sealing lip 62, which axially projects towards the end side of the bushing 22; in intended assembled constructions of the sealing assembly, the sealing lip 62 also sealing abuts on the end side of the bushing 22, in a manner of speaking, outside of the sealing edge 42 of the sealing ring 40, whereby a supplemental protection is advantageously provided for the sealing edge 42 of the sealing ring 40.

Furthermore, the inner surface side of the left axial end of the elastic ring 60 is formed with an annular-extending bulge 66. This should advantageously and security prevent an installation of the elastic ring 60, in which it is incorrectly rotated by 180°. At the same time, said bulge 66 constitutes a supplemental sealing between the elastic ring 60 and the support ring 50. Finally, the outer surface side of the elastic ring 60 is formed with an annular-encircling bulge 68 that obliquely and outwardly projects towards the right side. After appropriately inserting the elastic ring 60, this should advantageously prevent the elastic ring 60 from falling-out during its mounting.

In the FIGURE, the first and second portions of the track and the spacer ring 32 are illustrated in the manner assembled as intended, whereas the elastic ring 60 and the sealing ring 40, in particular, are illustrated in a still-undeformed state that exists before the two portions of the track are pushed together. When the two portions of the track are assembled as intended, as illustrated in the FIGURE, then the elastic ring 60 is highly deformed, whereby the elastic ring 60 sealingly abuts on the outer track link 14, simultaneously pressing the inner surface of the sealing ring 40 against the outer surface of the support ring 50 and pressing the sealing edge 42 against the end face of the bushing 22. Further, the sealing lip 62 of the elastic ring 60 is thereby pressed against the end face of the bushing 22 and the projection 64 of the elastic ring 60 is pressed against the sealing ring 40.

REFERENCE NUMBER LIST

12 Pin
14 Outer track link

22 Bushing
24 Inner track link
32 Spacer ring
40 Sealing ring
42 Sealing edge
46 Recess
50 Support ring
60 Elastic ring
62 Sealing lip
64 Projection
66, 68 Bulge

The invention claimed is:

1. A sealing assembly for sealing between a first portion of a track and a second portion of the track, the first portion being at least pivotable relative to the second portion, the sealing assembly comprising:
   a sealing ring configured to seal a lubrication chamber defined at least in part by the first and second portions of the track and having an annular sealing edge configured to sealingly abut on an opposing surface of the second portion,
   an elastic ring configured to fixedly abut on the first portion and apply pressure onto the sealing ring, and
   a support ring engaging a radially-inner surface of the sealing ring, wherein the support ring comprises a radially-outwardly extending portion that at least partially encompasses an adjacent axial end of the sealing ring, the support ring being configured to at least substantially prevent a direct contact of the sealing ring with the first portion of the track at least in a radially inward direction, the sealing ring being devoid of any indentation that accommodates at least a portion of the support ring.

2. A sealing assembly according to claim 1, wherein the elastic ring comprises an axially-projecting, hollow cylinder-shaped sealing lip configured to at least substantially radially encircle the sealing edge of the sealing ring and to sealingly abut on the opposing surface of the second portion of the track.

3. A sealing assembly according to claim 2, wherein:
   a plurality of radially-extending indentations are defined in the sealing ring and are distributed in a circumferential direction of the sealing assembly,
   a plurality of corresponding radially-extending bulges are defined on the elastic ring and respectively nest in the indentations, wherein rotation of the sealing ring relative to the elastic ring is prevented,
   the sealing ring has a substantially L-shaped longitudinal cross-section,
   the support ring has a substantially S-shaped longitudinal cross-section,
   the elastic ring comprises an annular bulge that extends radially inward from an inner surface of an axial end that is opposite of the opposing surface of the second portion of the track, the annular bulge of the elastic ring at least partially contacting an axial end of the sealing ring that is opposite of the sealing edge and contacting an axial end of the support ring, wherein the sealing ring is axially retained by the annular bulge of the elastic ring and the support ring,
   an outer surface of the elastic ring comprises an annular bulge that projects radially outwardly and obliquely generally in a direction towards the opposing surface of the second portion of the track,
   the sealing ring comprises polyurethane,
   the elastic ring comprises rubber, and
   the sealing edge and the sealing lip are configured to sealingly abut on an end face of a bushing of the second portion of the track.

4. A sealing assembly according to claim 1, wherein at least one of the elastic ring and the sealing ring is configured so as to prevent the elastic ring from rotating relative to sealing ring.

5. A sealing assembly according to claim 4, wherein one of the elastic ring and the sealing ring is formed with a plurality of indentations, which extend in at least one of the axial direction and the radial direction of the sealing assembly and are distributed in the circumferential direction, and the other of the elastic ring and the sealing ring is formed with a plurality of corresponding bulges, which extend in at least one of the axial direction and the radial direction of the sealing assembly and are distributed in the circumferential direction, the bulges respectively nesting in the indentations.

6. A sealing assembly according to claim 1, wherein the sealing ring has a substantially L-shaped longitudinal sectional surface and the support ring has a substantially S-shaped longitudinal sectional surface.

7. A sealing assembly according to claim 1, wherein the elastic ring comprises an annular bulge that extends radially inward from an inner surface of an axial end that is opposite of the opposing surface of the second portion of the track.

8. A sealing assembly according to claim 1, wherein an outer surface side of the elastic ring comprises an annular bulge that projects radially outwardly and obliquely in a direction generally towards the opposing surface of the second portion of the track.

9. A sealing assembly according to claim 1, wherein a portion of the elastic ring, which is configured to abut on a radial-extending outer surface of the sealing ring that is axially opposite of the sealing edge, comprises an axially-projecting, annular bulge.

10. A sealing assembly according to claim 1, wherein the support ring, the elastic ring and the sealing ring are designed to match to each other such that the elastic ring, together with the sealing ring, seals the support ring towards a radially outward direction.

11. A sealing assembly according to claim 1, wherein the elastic ring, the sealing ring and the support ring are formed as discrete parts.

12. A sealing assembly according to claim 1, wherein:
   the first portion of the track comprises a pin and at least one outer track link press-fit onto an end of the pin, and
   the second portion of the track comprises a bushing, which is pushed onto the pin and is at least pivotable about the pin, and at least one inner track link press-fit onto an end of the bushing.

13. A sealing assembly according to according to claim 12, wherein a spacer ring is disposed around the pin and between the outer track link and the bushing, and wherein the support ring is configured to maintain a gap between the support ring and the spacer ring.

14. A sealing assembly according to claim 13, wherein at least one of the spacer ring and the support ring is comprised of a metal and is stiffer than the elastic ring and the sealing ring.

15. A sealing assembly according to claim 12, wherein at least one of the sealing edge and the sealing lip are configured to abut on an end face of the bushing.

16. A sealing assembly according to claim 12, wherein the elastic ring is configured to extensively abut on the outer track link.

17. A sealing assembly according to claim 1, wherein the sealing ring is stiffer than the elastic ring.

18. A sealing assembly according to claim 1, wherein the sealing ring comprises polyurethane.

19. A sealing assembly according to claim 1, wherein the elastic ring comprises rubber.

20. A track hinge comprising:
- a first portion including a pin, and at least one outer track link press-fit onto an end of the pin, and
- a second portion of the track including a bushing pivotably disposed on the pin and at least one inner track link press-fit onto an end of the bushing, wherein the first portion is pivotable relative to the second portion and a lubrication chamber is at least partially defined by the first and second portions,
- a sealing ring having an annular sealing edge sealingly abutting on a radially-extending surface of the bushing,
- an elastic ring fixedly abutting on the at least one outer track link and biasing the sealing ring in axial and radial directions, and
- a support ring disposed radially inward of the sealing ring and engaging a radially-inner surface of the sealing ring, wherein the support ring comprises a radially-outwardly extending portion that at least partially encompasses an adjacent axial end of the sealing ring, the support ring being configured to at least substantially prevent a direct contact of the sealing ring with the first portion at least in the radial direction.

21. A track hinge according to claim 20, wherein:
- the first portion further includes a spacer ring disposed around the pin with a radial clearance and between the outer track link and the bushing with an axial clearance, the support ring acting as a shield to prevent the sealing ring from directly contacting the spacer ring in the radial direction,
- a plurality of radially-extending indentations are defined in the sealing ring and are distributed in the circumferential direction,
- a plurality of corresponding radially-extending bulges are defined on the elastic ring and respectively engage in the indentations, wherein rotation of the sealing ring relative to the elastic ring is prevented,
- the sealing ring has a substantially L-shaped longitudinal cross-section,
- the support ring has a substantially S-shaped longitudinal cross-section,
- the elastic ring comprises an annular bulge that extends radially inward from an inner surface of an axial end that is opposite of the opposing surface of the first portion of the track, the annular bulge of the elastic ring at least partially contacting an axial end of the sealing ring that is opposite of the sealing edge and contacting an axial end of the support ring, wherein the sealing ring is axially retained by the annular bulge of the elastic ring and the support ring,
- the elastic ring further comprises an axially-projecting, hollow cylinder-shaped sealing lip at least substantially radial encircling the sealing edge and sealingly abutting on the bushing,
- the sealing ring comprises polyurethane,
- the elastic ring comprises rubber, and
- the spacer ring and the support ring each comprise metal.

22. A sealing assembly for a track hinge comprising:
- a sealing ring having an annular sealing edge configured to sealingly abut on a radially-extending surface of a bushing of the track hinge,
- an elastic ring configured to fixedly abut on an outer track link of the track hinge and to bias the sealing ring in an axial direction and in a radially-inward direction, and
- a support ring disposed radially inward of the sealing ring and contacting at least a substantial portion of a radially-inner surface of the sealing ring, wherein the support ring comprises a radially-outwardly extending portion that at least partially encompasses an adjacent axial end of the sealing ring, the support ring being configured as a shield to at least substantially prevent the sealing ring from directly contacting a radially-inner portion of the track hinge at least in the radial direction.

* * * * *